United States Patent [19]
Duggan et al.

[11] Patent Number: 5,619,638
[45] Date of Patent: Apr. 8, 1997

[54] OBJECT BASED COMPUTER SYSTEM HAVING REPRESENTATION OBJECTS FOR PROVIDING INTERPRETATIVE VIEWS ONTO A DATA OBJECT

[75] Inventors: Hugh Duggan, Bristol, England; William Morel, Redmond, Wash.

[73] Assignee: Hewlett-Packard Company, Palo Alto, Calif.

[21] Appl. No.: 203,516

[22] Filed: Feb. 28, 1994

Related U.S. Application Data

[63] Continuation of Ser. No. 671,806, May 3, 1991, abandoned.

[30] Foreign Application Priority Data

Jul. 31, 1989 [GB] United Kingdom .................... 8917490

[51] Int. Cl.$^6$ ........................................... G06F 3/00
[52] U.S. Cl. .......................... 395/703; 395/710; 395/683; 395/340
[58] Field of Search ..................... 395/155–161, 395/200, 153, 200.04, 200.07, 200.08, 200.03, 133–140, 700

[56] References Cited

U.S. PATENT DOCUMENTS

| | | | |
|---|---|---|---|
| 4,674,042 | 6/1987 | Hernandez et al. | 395/140 |
| 4,674,043 | 6/1987 | Hernandez et al. | 395/140 |
| 4,899,136 | 2/1990 | Beard et al. | 395/157 X |
| 4,962,475 | 10/1990 | Hernandez et al. | 395/146 |
| 4,974,173 | 11/1990 | Stefik et al. | 395/159 |
| 5,008,853 | 4/1991 | Bly et al. | 395/153 |
| 5,050,104 | 9/1991 | Heyen et al. | 395/159 X |
| 5,062,060 | 10/1991 | Kolnick | 395/157 |
| 5,079,695 | 1/1992 | Dysart et al. | 395/700 |
| 5,175,848 | 12/1992 | Dysart et al. | 395/600 |
| 5,185,885 | 2/1993 | Dysart et al. | 395/600 |
| 5,214,756 | 5/1993 | Franklin et al. | 395/159 |

FOREIGN PATENT DOCUMENTS

0339221A2 11/1989 European Pat. Off. .

OTHER PUBLICATIONS

"Smalltalk V Handles Complex Object–Oriented Applications Development", PC Week, Feb. 23, 1988, p. 23(1).
McNierney, "Projecting a Graphics Interface", PC Tech, Mar. 1988, p. 54(8).
Petzold, "Introducing the OS–2 Presentation Manager", PC Mag., Jul. 1988, p. 379(10).
Welch, "Creating User–defined Controls for your own Windows Applications", Microsoft Systems Journal, Jul. 1988, p. 54(13).
"The Smalltalk–80 System", Xerox Learning Research Group, Byte, Aug. 1981, pp. 36–48.
Goldberg et al., "Is The Smalltalk–80 System for Children?", Aug. 1981, pp. 348–368.
Tesler, Larry, "The Smalltalk Environment", Aug. 1981, pp. 90–147.
*HyperCard User's Guide,* Apple Computer, Inc., 1988, pp. 1–19, 32–63, 72–81, 120–129, 146–161.
"NoteCards in a Nutshell", Halasz et al, ACM, 1987, pp. 45–52.
Foster et al., "Lognoter", CSCW '86, 1986, pp. 7–15.
Advanced Interface Design Guide, IBM, Jun. 1989, pp. 95–101.
Budd, "A Little Smalltalk", Addison–Wesley Pub., 1987, pp. 1–58, 222–223, 242–243, 244–245.

(List continued on next page.)

*Primary Examiner*—Raymond J. Bayerl
*Assistant Examiner*—John E. Breene

[57] ABSTRACT

Object based computer system which has objects and object parts which are either (a) semantic, relating to stored data, or (b) presentation, relating to presentation of the semantic objects to the user. Multiple presentation objects, or viewers, can be linked to a particular semantic object so that an intelligible user's model of the system results. Representation objects provide particular forms of presentation of data of the semantic objects and may be linked so that alternative and multiple presentations of the data of a semantic object are possible.

5 Claims, 9 Drawing Sheets

OTHER PUBLICATIONS

P. Brady, "Personal Productivity Using AI Techniques", *HP World*, vol. 1, No. 11, Nov. 1988, pp. 24, 25, 27.

P. Chrysanthis et al., "The Gutenberg Operating System Kernal", *IEEE*, Nov. 2, 1989, pp. 1159–1168.

J. A. Dysart, "The New Wave Object Management Facility", *Hewlett Packard Journal*, vol. 40, No. 4, Aug. 1989, pp. 17, 18, 20 and 22.

OBJECT BASED COMPUTER SYSTEM HAVING REPRESENTATION OBJECTS FOR PROVIDING INTERPRETATIVE VIEWS ONTO A DATA OBJECT

This a continuation, of application Ser. No. 07/671,806, filed May 3, 1991, now abandoned.

BACKGROUND OF THE INVENTION

The present invention relates to an object based computer system having semantic and presentation objects.

The terms useful in describing an object based system in a windows environment in accordance with the invention will first be described by way of overview.

An "object" is a combination of data and method code which is normally stored on disc. Objects intercommunicate by sending "messages", i.e., data, instructions, requests, etc., to one another, normally via object management software ("object manager"). If the object management software wishes to pass a message to an object, a process will be initiated which reads the data file for the object as part of its initialization. If an object is fully defined by its disc file and has no process associated with it, it is said to be "inactive". However, if an object has a process associated with it and is defined by the state of that process, then it is said to be "active". Generally, an object can be regarded as a discrete entity, e.g., it can be individually moved, copied, destroyed, etc. Thus, for the embodiment to be described, an object will have a unique identifier and it can be sent a message.

Objects can be "linked" to other objects so that information is passed back and forth by messages in a predetermined manner dependent on the nature of the link. The term "link" thus can have several different meanings in relation to an object based system. Furthermore, as described below, windows may also be objects ("representation objects") and have inter-object links with other windows. More will be said below about other inter-object links and "window links" in the specific description with reference to the attached drawings. However, for purposes of defining the present invention, the consequence of linking two objects will be that one is notified of changes made to the other during object processing. This "updating" link may be bidirectional.

In this specification, when there is a risk of confusion between window objects and other objects, the latter will be termed "semantic objects". Generally, however, the term "object" will mean "semantic object". However, an object as used herein can be thought of as comprising a semantic part (which defines the state of the object) and a presentation part (for presenting to a user the state of the object). Indeed, conceptually one can think of there being separate semantic objects and presentation objects. In addition, when using a windows user interface, there are windows for viewing objects and facilitating multi-tasking. In this specification, the presentation part or presentation object thus will be something which is utilized by a window and forms part of the window for the time in which the window is viewing the object in question and generally a distinction between the window and the presentation part or object will not be made. It will also be apparent to those skilled in the art how to provide multiple concurrent presentations of a semantic object in accordance with the invention.

Semantic objects have data stored in a particular storage domain. A storage domain may be regarded as closely equivalent to a storage medium such as a hard disc or floppy disc in the sense that all objects in a given storage domain are on-line together or are off-line together. Consequently, a single machine may support a plurality of storage domains.

It is also convenient to use a graphical user interface such as a windows interface since in such a system it is possible to open one or more windows on each object. The windows manage the display and provide input/output (lexical) interaction in the system. The use of multiple windows in conjunction with an object enables employment of the techniques of sharing (multiple windows to a common object) and distributed applications (a window is on one machine and the object is on another).

The present invention could be applied in a single computer having one or more storage domains but is primarily concerned with an object based system having a plurality of user stations. Such a system may be provided by a single central processing device having a plurality of user stations coupled to it, or it may be provided by a distributed processing network consisting of a number of independent processing units each having a respective station associated with it.

In existing systems, different users can, in concurrent sessions, alter data in the same data file (or object) such that each alteration and display is effectively carried out independently. However, a difficulty in such systems is that, despite careful record-locking procedures, the users do not have immediate cross references and updates for concurrent changes made by other users of the data file. The present invention seeks to overcome this difficulty by providing "representation" objects.

SUMMARY OF THE INVENTION

In accordance with the present invention, there is provided an object based computer system having an object manager for activating objects, where the objects are capable of being linked and include at least one representation object which, in use, is interpretative of the data of an object to which it is linked and which takes some or all of its state from that object. Means are also provided for presenting the representation object to the user. The present invention also has the advantage of enabling the provision of a graphical representation, such as a pie chart or bar chart, which is driven by the data of an object to which it is linked.

Preferably, the system of the invention also comprises means for concurrently linking a plurality of representation objects to the same object for interpreting the data of that object. In this way, concurrent users are made aware of changes made by each other to an object. Also, sometimes it is desirable to present data from an object in different ways. For example, a visible data object (VDO) (to be more fully described below) may have several dimensions, or vectors, and there may be a requirement to show data therein as a bar chart or a pie chart. Accordingly, two or more different representation objects of the invention may be linked to the same semantic object to give different concurrent representations (say a bar chart and a pie chart) of the same data. Preferably, the system of the invention also comprises means for concurrently linking a plurality of representation objects to different parts of the same object for interpreting different parts of the data of that object.

In the embodiment to be described herein, the system comprises means for providing a plurality of concurrent presentations of a representation object. For example, two or more windows may be opened on a representation object. It also will be seen that the representation/semantic split extends the principle of the semantic/presentation split to higher levels in the system of the invention.

Preferably, the system of the invention also comprises means for changing the data of an object by changing a representation object linked to that object. Thus, it is by changing the representation object that a user can alter the data in the semantic object to which the bar chart, table or whatever is linked.

It is further envisaged in accordance with the invention that the semantic object may itself be linked to a further semantic object and take some or all of its state from that further object. In this way, the number of levels between an underlying semantic object holding data and the representation of the data to a user can be chosen according to particular requirements.

The system described herein has a windows user interface called "Task Windows" which can be switched by a user to be linked to chosen semantic objects in turn so as to provide a user model of the system in which the Task Windows are navigable viewers of the object world. The user's access mechanisms are thus Task Windows (or "Viewers") which have an existence in their own right and which are navigated by the user to look at the objects in the world. A Task Window may be directed to focus on different objects in turn and sometimes a Task Window may be looking at no object at all.

The Task Window as herein defined thus presents the appearance of the object to the user and accepts the user's input. It is important to note that an object has an implicit appearance and will look the same in all Task Windows. The semantic/presentation split allows multiple Task Windows to be attached to an object. It is important to note that all Task Windows are seeing the same object—not a version of it. Thus, when a user manipulates an object he changes it for everyone. The semantic object updates all Task Windows of its state and the user will see the end effect.

It has not been the practice to regard windows as objects, but by treating them as a special class of object in accordance with the invention, certain benefits have been found to follow. As a class of object, windows differ from other objects in that they are not stored on disc as data files and they are always transient and active. They are thus processes which have transient data associated with them.

In accordance with the invention, it is convenient to provide a hierarchy of objects (including windows) with rules which determine their interaction. Thus, there may be "primary objects" otherwise known as "high level objects" which can be linked to a "primary window" or Task Window. Such primary objects may thus be viewed by their windows independently of other objects of which they may notionally be part. On the other hand, "secondary objects", or "low level objects" may be viewed only by way of "Secondary Windows" which are governed by a Task Window linked to an object of which the secondary object may notionally be part. A representation object is a secondary object in the embodiment to be described.

It is preferred that the system is a network system with multiple computers in respective locations. With such a system the invention allows interactive manipulation and display of data across a network, it being possible for different users to have different types of representations of the same or different parts of an object. Accordingly, any change to the contents of the object effected by one user will be reflected in the presentations to the other users, whatever type of representation object they are employing and whether they are viewing the same section of the object or not. This is a significant extension to the "what you see is what I see" idea and yet is achieved with simple object linking and messaging.

BRIEF DESCRIPTION OF THE DRAWINGS

The invention will further be described by way of example with reference to the accompanying drawings, of which.

DETAILED DESCRIPTION OF THE PREFERRED EMBODIMENT

Figure 1:
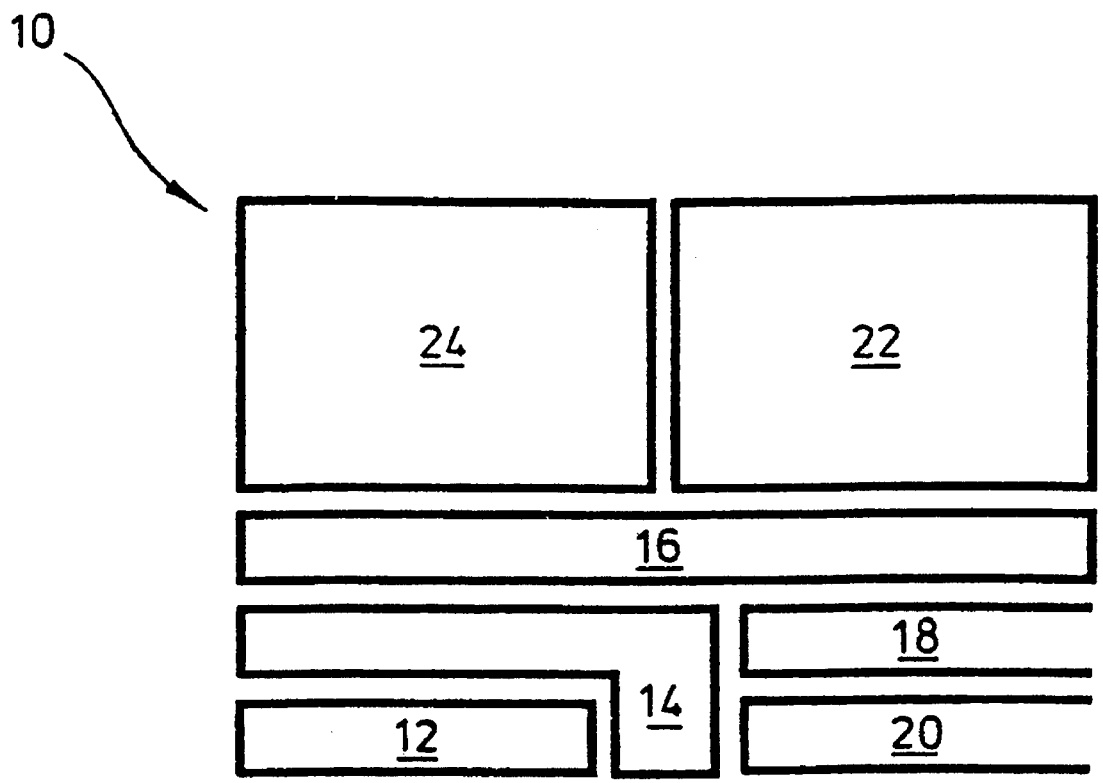
FIG. 1 is a diagram showing the software components of the system of the invention.

FIG. 1 illustrates the software components of a distributed object based system 10 in accordance with the invention. The system 10 may run on networked personal computers each provided with a hard disc, a flexible disc drive and a networking card. In other words, as shown in FIG. 1, each PC is loaded with operating system software 12, such as MSDOS; windows interface software 14, such as Microsoft Windows; object management software (Object Manager (OM)) 16; distributed message switching software 18; local area networking software 20; windows software 22, such as MS Windows Applications; and semantic objects software 24.

The OM 16 controls the sending and receiving of messages by objects and maintains a catalogue of objects which reside on the machine. In addition, the OM 16 activates an inactive object if a message is received for it and deactivates objects when system memory runs short. The OM 16 also acts as a library to provide primitive utility functions to objects and other processes. In the preferred embodiment, the OM 16 is an MS Windows application although it has no window and therefore cannot be viewed.

The distributed message switching software (Distributed Message Switch (DMS)) 18 is a terminate and stay resident program and functions as a message router used by the OM 16 to send messages to the correct destinations. The DMS 18 will route messages to a local or remote OM as appropriate. In the preferred embodiment, the local area networking software 20 comprises two terminate and stay resident programs —one according to IEEE 802.3 standard and the other providing IEEE 802.2 Class I and III services.

The windows software 22 comprises a system window application (System Window) and window applications for displaying window objects (Task Windows). The System Window is a process which controls a user session and will be described below with respect to FIG. 2.

The objects software 24 comprises the semantic objects of the system 10, each of which includes a set of stored data. An object may be active or inactive as defined above. Every object in the entire distributed system has its own unique identifier, and each object identifier has a part indicating in which storage domain the object was created and a part unique within that storage domain. This identifier does not change if the object subsequently moves to a different storage domain. The objects in the system 10 are mobile and may be moved, copied and otherwise manipulated by any user irrespective of where in a physical sense the user and the objects are located. Such manipulation is achieved in a manner which is consistent for all object types. In other words, the network is transparent to a user of the system. An object, or part of an object, may be viewed by a plurality of Task Windows (belonging to one or more users) at the same time, and will have the same appearance in each Task Window.

In the preferred embodiment there are two types of semantic object—primary objects and secondary objects. All objects, except the Desktop, have a container. Some primary objects can contain other semantic objects and can be viewed by Task Windows in isolation from their containers. However, there are some primary objects which cannot contain other objects, e.g., the ChessBoard and the Visible Data Object (VDO).

Primary objects have an icon which consists of a small picture representing the primary object and a title. The icon, or miniaturized version of the primary object, is seen when the container of the primary object is viewed. Icons can be used to move or copy the associated primary object, and double-clicking on an icon causes the Task Window in which the icon was seen to change to view the selected primary object.

Examples of primary objects are a Folder, a Document, and a Visible Data Object, (VDO). The VDO acts as a store for data and its dimensions are set by the user. The structure of a VDO can be viewed by the user but the actual data stored in the VDO cannot be viewed directly.

In the preferred embodiment, secondary objects cannot contain other objects. They can only be viewed as part of their container object—they do not have miniaturized (iconic) states. They are used to supplement their container by providing an annotation or more complex representation as will be explained below.

The types of object will now be more fully described. Window objects will be first described and then semantic objects will be described.

Window objects also have the basic features of data and associated methods together with a unique identifier and the ability to receive and respond to messages from other objects. However, they differ from semantic objects in that they are transient, i.e., not stored to disc. Semantic objects, on the other hand, are stored so that they persist even when the relevant machine is switched off. Window objects obtain their data from the System Window and the semantic object which they are viewing rather than from disc.

There are three types of window objects, namely, the System Window, Task Windows and Secondary Windows. Each Window Object has its own unique object identifier. This identifier has an element identifying the storage domain on which the window was created and an element which is unique within that storage domain.

Figure 2:
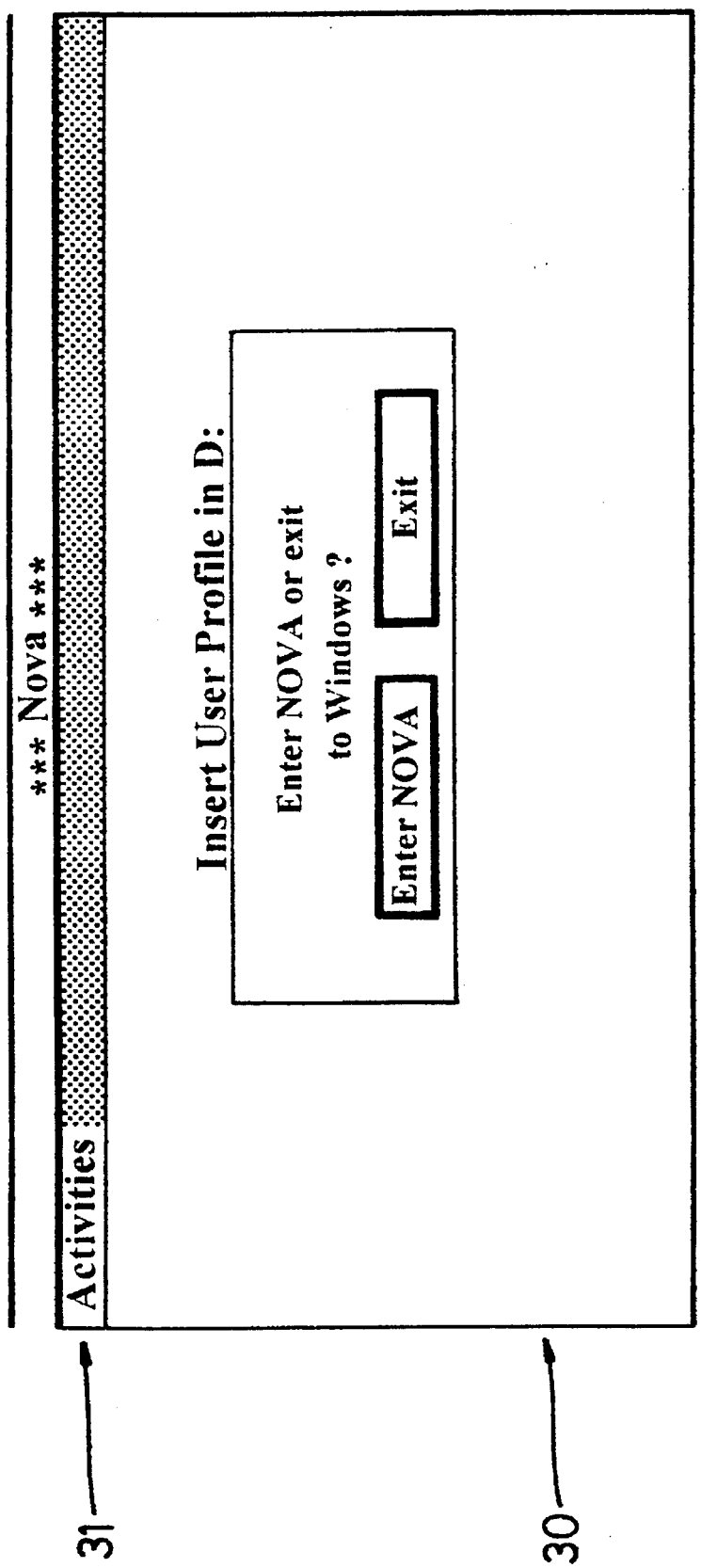
FIG. 2 shows the System Window.

The System Window is started automatically by the OM 16 and remains in memory while the system 10 is running, controlling the creation, destruction, opening and closing of Task Windows. The System Window also handles a user logging in and out of the system 10. FIG. 2 shows the System Window 30 which covers the whole screen and acts as a background once a user has logged into the system. There is an "Activities" Menu bar 31 at the top of the System Window. As shown, the System Window 30 simply gives the user the option of entering the system or exiting.

Figure 3:
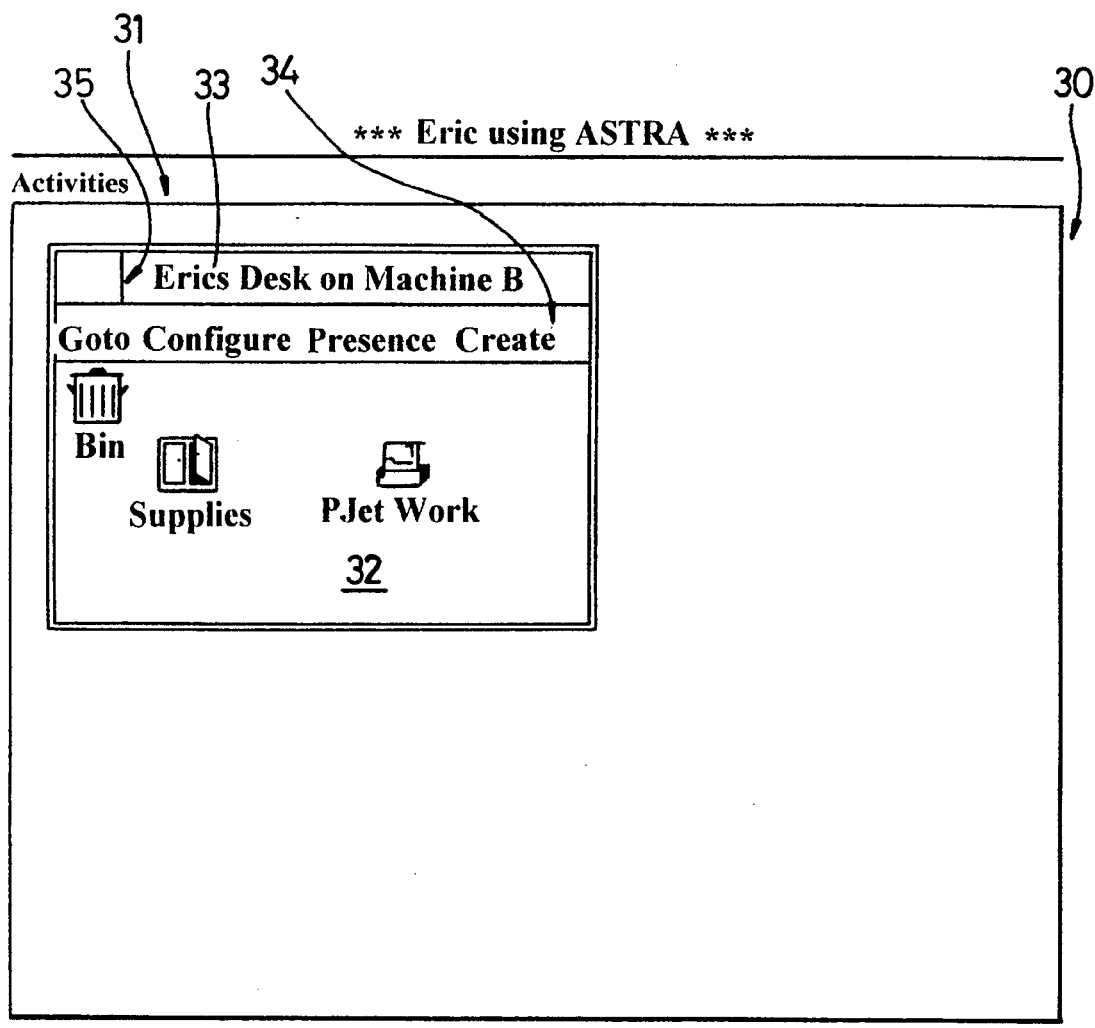
FIGS. 3 & 3A show a typical Task Window.

The user can control the size and position of a Task Window as well as choosing which object the Task Window is to view. FIG. 3 shows a typical Task Window 32. The title 33 of the Task Window 32 shows the name (Eric's Desk) of the object which the Task Window 32 is viewing and the name of the machine (Machine B) on which that object resides. The Task Window 32 has a menu bar 34 which offers a "GOTO" pull-down menu as well as "CONFIGURE", "PRESENCE" and "CREATE" pull down menus. In the example of FIG. 3, the Desktop object is seen to contain three objects—Colleagues (Bin), Supplies and PJetWork (which is a folder object).

A Task Window 32 may be either visible (open) or invisible (closed). The System Window 30 controls the opening and closing of Task Windows 32 and the user can close a Task Window 32 by double-clicking its "system box" 35. In this way a user may have several tasks running in the background and switch rapidly among them.

A Task Window can only view one primary object at a time. By clicking on an icon or button (a "Semantic Object") the Task Window 32 can be switched to view a different object. Each user has up to seven Task Windows 32 available. The user thus can view up to seven primary objects at the same time by creating the required number of Task Windows and navigating these to chosen objects.

The System Window 30 stores data for each Task Window 32 that it controls. Namely, the System Window 30 stores:

a) Task Window Object ID;

b) Window Handle (an internal identifier used for the windows software 22);

c) Border Color;

d) Open/Closed Flag;

e) Window Icon Flashing Flag;

f) Object ID of object being viewed by the Task Window;

g) Icon and title of viewed object.

Figure 3A:
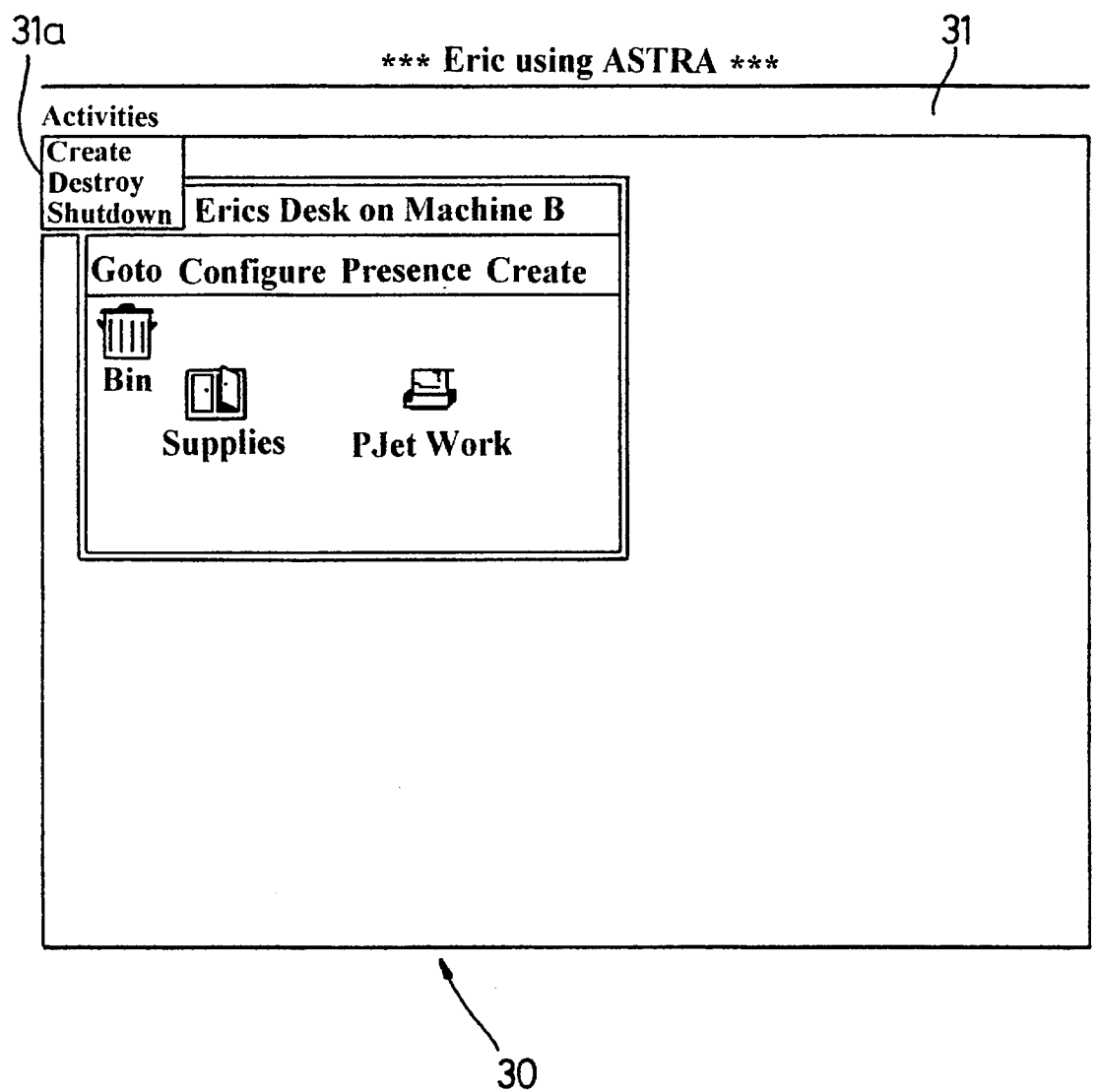

To create a Task Window 32, a user selects the "Create" item from the "Activities" menu shown at 31a in FIG. 3A. The System Window 30 updates its internal window information and sends a Window Create message to the new Task Window 32 containing the above information. New Task Windows start by viewing the Desktop. The System Window 30 disables all user input before sending this message and re-enables it on receiving a Window Create Done reply message from the new Task Window.

There is a Task Window subsystem which handles all operations forming part of the viewing mechanism such as moving and sizing the window, shutting the window, changing the object viewed, etc. Operations which are specific to the object viewed are handled by a dynamic link library suitable for that class of object. The dynamic link library is unloaded when the Task Window 32 is no longer viewing that object.

Each Task Window 32 stores the Object ID of the primary object which it is viewing and information about which part of that object is being viewed. The Task Window 32 also stores the name of the relevant dynamic link library for the object which is being viewed. There can be more than one Task Window 32 viewing an object at any one time so that, in a distributed system, a plurality of users can view the same object at the same time.

Figure 4:
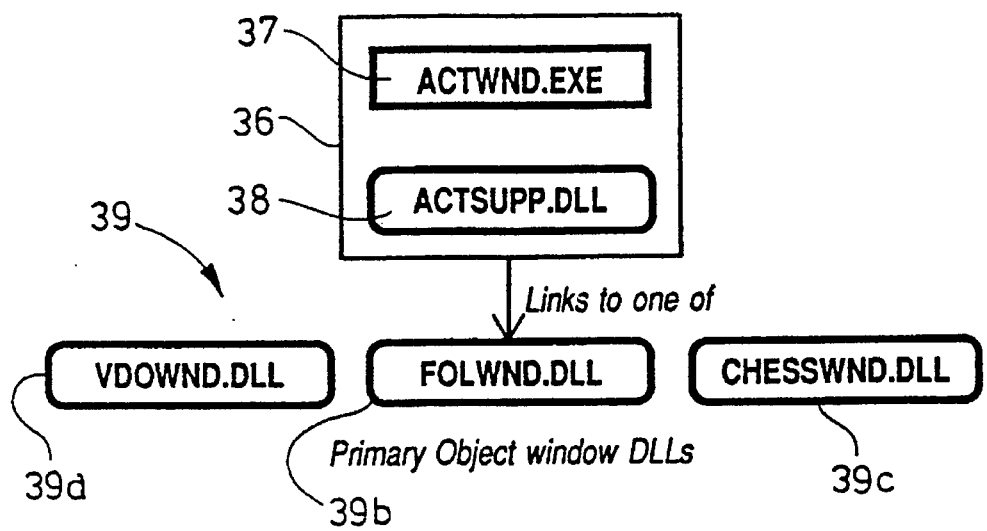
FIG. 4 schematically illustrates a Task Window subsystem.

FIG. 4 depicts a Task Window subsystem 36 comprising a main program 37 (ACTWND.EXE) for activating Task Windows and a supporting library 38 (ACTSUPP.DLL). The subsystem 36 is linked to one of a set of dynamic link libraries 39 for different classes of object. For example, the set 39 includes dynamic link libraries for VDO (VDOWND.DLL), Folder (FOLWND.DLL) and ChessBoard (CHESSWND.DLL) primary objects referenced 39a, b and c respectively. These are the presentation parts for the respective semantic objects previously defined.

The dynamic link library 39 caches information enabling the repainting of the relevant presentation object, or part of it as appropriate, without the need for communication with the semantic object. During operation, the Task Window 32 sends generic information to the Task Window subsystem 36 and sends information specific to the particular presentation object to the relevant dynamic link library 39.

A Task Window 32 can display any type of semantic object and it is a Primary Window in the sense that it can be linked to any primary object type, e.g., Folder, VDO, etc. If the primary object which a Task Window is viewing contains a secondary object, e.g., a Bar Chart, the Task Window creates a Secondary Window and links it to the secondary object as will be described below. These Secondary Windows are created automatically when the user moves the Task Window from the container.

Task Windows are linked to semantic objects by a GOTO operation which will often involve a GOAWAY operation. The first step in the GOTO operation is for the Task Window 32 to send an AddViewer message to the desired object. This object will store the Task Window ID and reply with a Here Contents message. The first part of the Here Contents message provides information on the object ID, class, icon and the relevant dynamic link library 39. This causes the subsystem 36 to load the relevant dynamic link library 39. The remainder of the Here Contents message is private to the object and is passed to the dynamic link library 39.

If the object to be viewed contains any secondary objects, the Task Window creates a Secondary Window for each secondary object. A Secondary Window is a child window used to display and interact with a secondary object on the surface of a primary object which contains it. Secondary Windows differ from Task Windows in that they are created to view one object and are destroyed when that view is no longer needed, whereas Task Windows are used to view many objects in succession.

Figure 5:
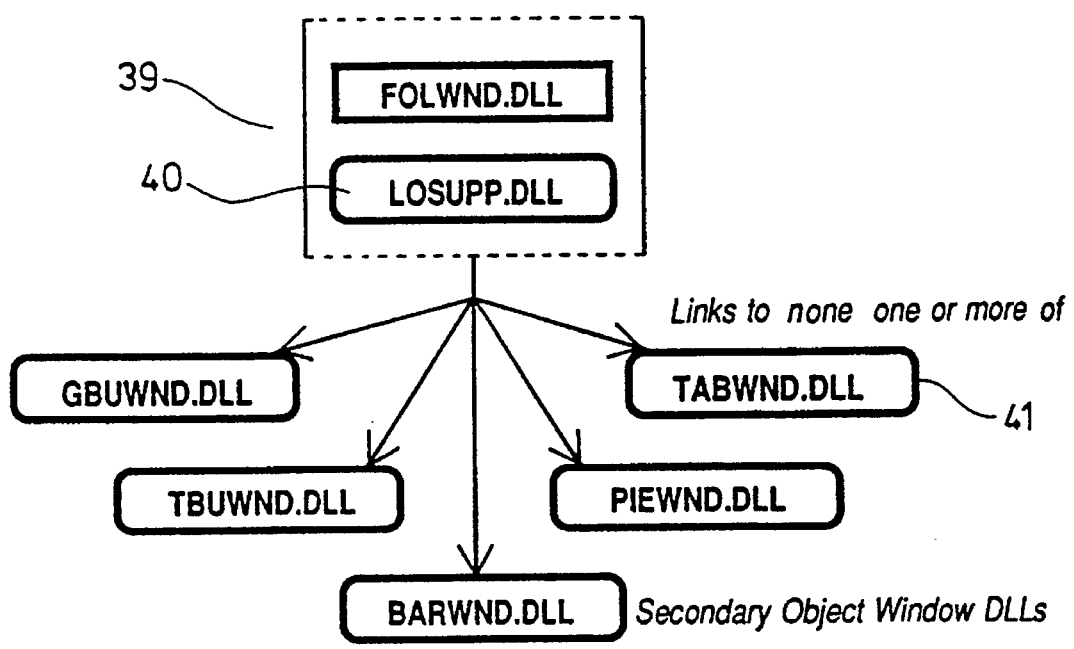
FIG. 5 schematically illustrates a dynamic link library subsystem.

When a dynamic link library 39 for a primary object initially receives a Here Contents message, that will include a list of contained secondary objects. As shown in FIG. 5, the dynamic link library 39 uses a support library 40 (LOSUPP.DLL) to provide it with utility functions including the creation and registration of Secondary Windows for any contained secondary objects and their position in the primary object.

An Add Viewer message is sent to each such secondary object. In due course each such Secondary Window will receive its own Here Contents message including the name of the secondary object dynamic link library 41, for it to use. This secondary object dynamic link library is then loaded and all messages for the Secondary Window are passed to a window procedure in the secondary object dynamic link library 41.

The GOAWAY operation starts by the Task Window 32 sending a Remove Viewer message to the viewed object. If the Task Window has created Secondary Windows, this message is also broadcast to them causing them to destroy themselves. All objects which receive the Remove Viewer message update their list of windows and reply with a Viewer Removed message. The Task Window 32 knows how many replies to expect and, when these are received, the GOAWAY operation is complete. The Task Window 32 may then view another object, or shutdown or destroy itself.

To destroy a Task Window 32, the user selects the Destroy item from the Activities menu 31. The mouse can then be moved and clicked anywhere on the screen, and all other user input is temporarily disabled. If the mouse is clicked over a Task Window, the System Window sends a Window Destroy message to that Task Window which replies with a Window Destroy Done message. The Window Destroy message causes the Task Window to initiate a GOAWAY operation as described above.

Figure 6:
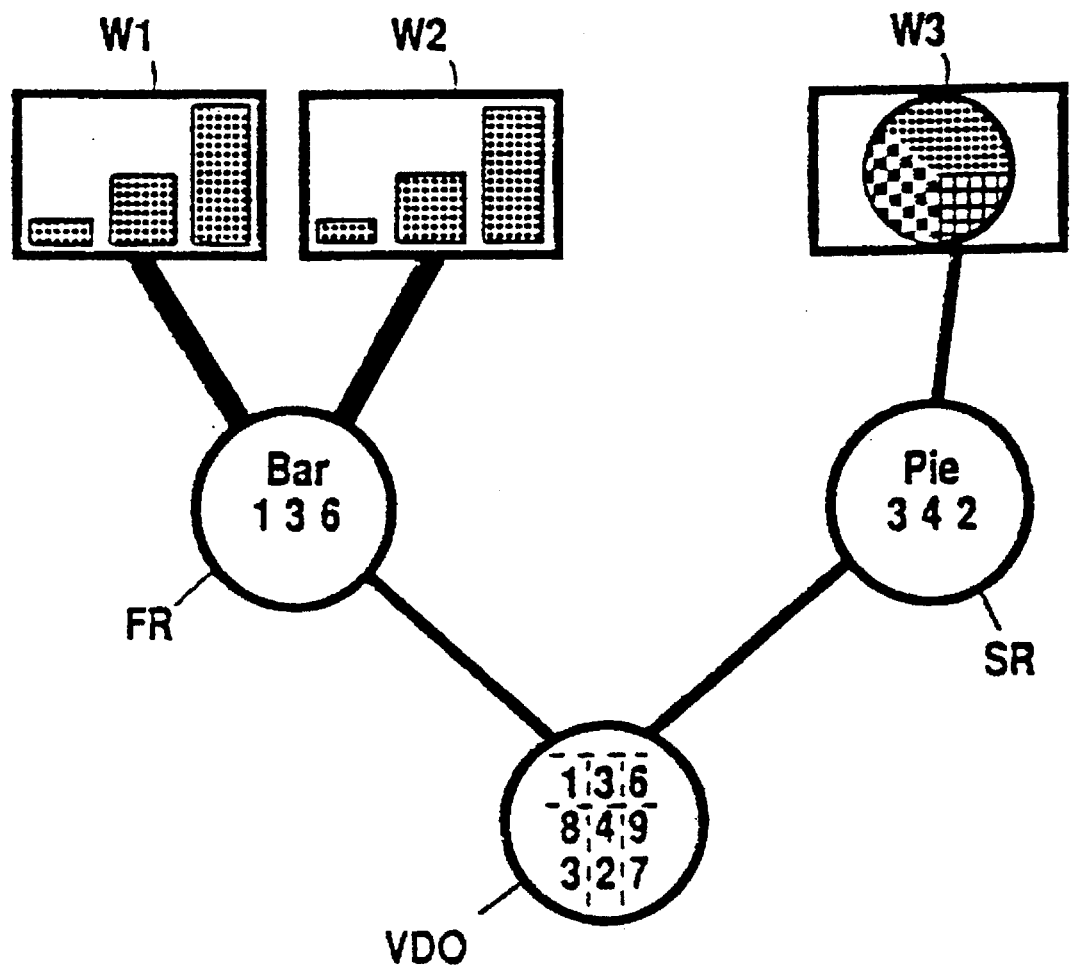
FIG. 6 schematically illustrates a representation/semantic object split.

FIG. 6 shows a VDO which comprises a 3×3 table having integers 1, 3, 6, 8, 4, 9, 3, 2, 7. The VDO is a semantic object which is linked, by simple binding and messaging techniques to be described, to the semantic parts FR and SR of first and second representation objects. FR is a bar chart representation object and SR is a pie chart representation object. The semantic parts are thus split from the representation parts. In this way not only can separate presentation windows W1 and W2 be opened on FR, but also the different representation objects can be linked simultaneously to the VDO. The presentation window on SR is shown at W3. Windows W1 and W2 show the bar chart of integers 1, 3 and 6 and Window W3 shows the pie chart of integers 3, 4 and 2.

Figure 7:
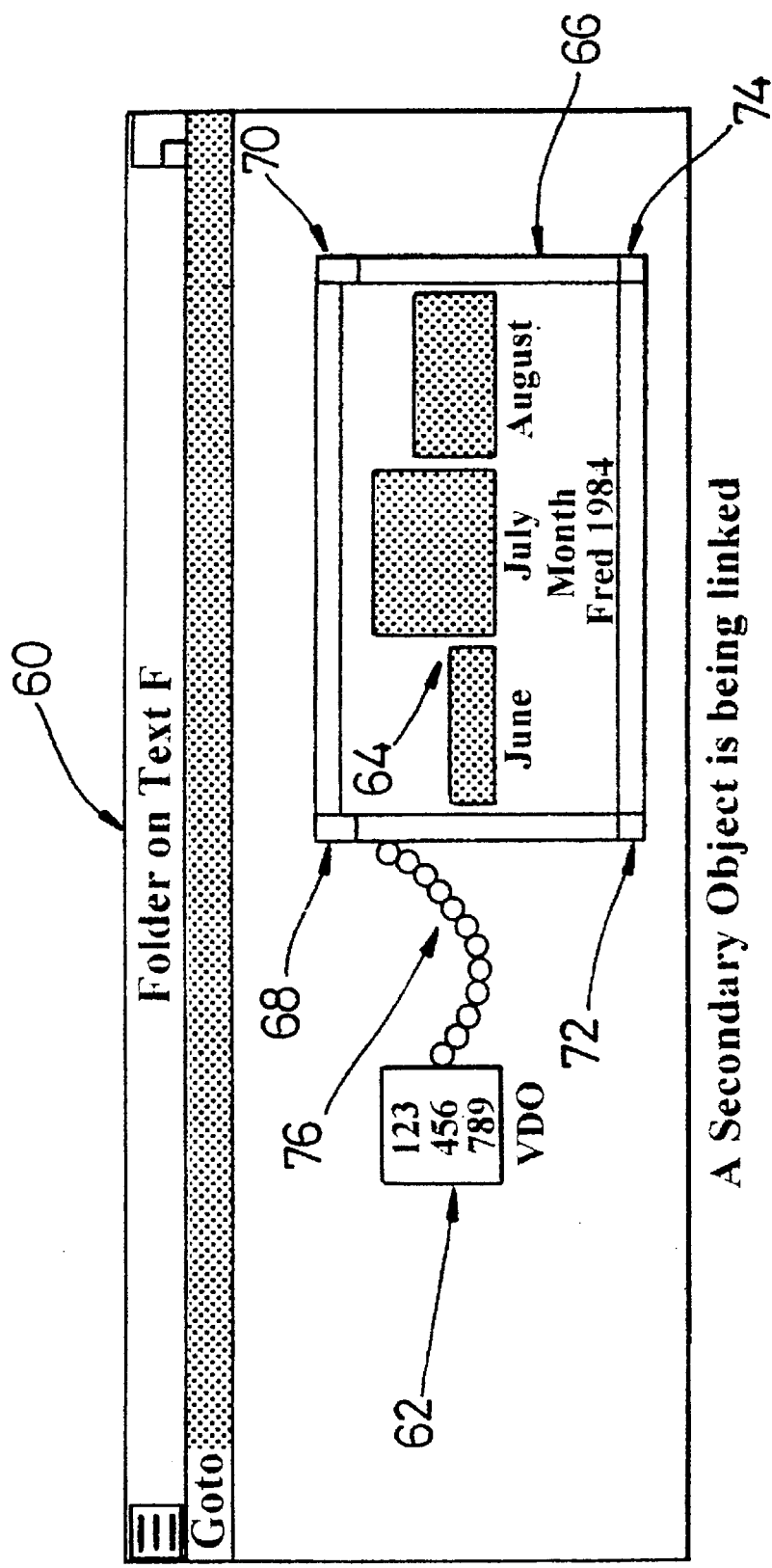
FIG. 7 illustrates a screen representation showing a linking operation.

The user is able to link a secondary object to a primary object in the course of a user session. FIG. 7 shows a screen with a view of part of a folder 60 containing a Visible Data Object (VDO) 62 (a primary object) and a Bar Chart 64 (a secondary object). Each secondary object has a border 66 which appears when the input device, e.g., mouse cursor, is positioned over it. The border has a link box 68, an unlink box 70, and two size boxes 72 and 74. The Bar Chart 64 is linked to the VDO 62 by clicking the mouse over the link box 68 and dragging the mouse to the VDO and releasing the mouse. This causes a "Chain" 76 to appear on the screen.

On releasing the mouse, the Secondary Window (SW) viewing the Bar Chart 64 queries the Primary Window (PW) viewing the VDO 62 whether the VDO will accept a link from a Bar Chart. A negative response would cause the operation to be aborted. However, in this case the link is acceptable and a LINK (Target Object) message is sent by the Secondary Window to the Bar Chart. If the Bar Chart 64 is already linked, it sends an UNLINK message to the object to which it is currently linked.

In the particular case of a VDO linking to a representation object, the link must be to a specific part of the VDO. Therefore, the Bar Chart 64 sends a Get VDO Info message to the VDO 62. This causes the VDO to send a description of itself to the Bar Chart. The secondary window SW then displays a dialogue to enable the user to select the part of the VDO to which the Bar Chart is to be linked.

The effect of the Bar Chart 64 being linked to the VDO 62 is that any changes in the relevant part of the VDO are automatically reflected in the Bar Chart. Also, the data in the VDO can be changed by making alterations to the Bar Chart. Other representation Objects such as Pie Charts and Tables can be linked to a VDO in a similar manner. The Bar Chart and the VDO also may be in different storage domains in a distributed system. A plurality of representation objects can also be linked concurrently to the same or different parts of a VDO in this manner. In addition, a plurality of users may concurrently view a representation object.

To unlink a secondary object, the user selects its unlink box 70. This causes the secondary window SW viewing the secondary object to send an UNLINK message to the object.

The secondary object clears its link data and sends an UNLINK message to the primary object to which it is linked. The primary object then amends its list of linked objects. In the event of a primary object to which a secondary object is linked being destroyed, the secondary object receives an UNLINK message and clears its link data. If a representation object, such as a bar chart, is unlinked, it will retain the values and labels which it last received from the VDO to which it was linked. These values can still be changed by a user but such changes will no longer update the VDO.

During a user session optional selections may be made by a user. The following description discusses the passage of messages in a system according to the invention in respect of editing the VDO description and representation range and changing the VDO values.

The description of a VDO (the number and names of its dimensions, and the number and names of the indices within each dimension) may be edited by a user in the primary window viewing it, but no messages will be sent until the user clicks the "OK" or "Cancel" buttons which are displayed to the user. If the "Cancel" button is clicked, the window will restore the original (pre-edit) description. It does this by sending WIN2VDO_GIVEDESCRIPTION message to the VDO, which then replies with VDO2WIN_NEWDESCRIPTION. The second message includes a full description of the state of the VDO, which the window uses to restore its appearance.

If the user clicks "OK" to make a change to the VDO's description, then the window sends WIN2VDO_NEWDESCRIPTION (New Description) to the VDO. When the VDO receives this, it updates its description. It is to be noted that the VDO's description is altered but the data it stores is not, though the amount of data may be altered. For instance if a 3×3 VDO is altered to become a 4×2×2 VDO, then some data elements, the bottom 3×2, will be unchanged. One row of the original 4×2 table will be deleted, and a new zero-initialized 4×2 table will be added to make the VDO 3-dimensional. Having adjusted itself, the VDO must tell any object that might be interested in the change.

Firstly, the altered VDO informs all its Task Windows by sending them VDO2WIN_NEWDESCRIPTION messages. Each window that receives this message updates its appearance from the description given in the message. Then, the VDO broadcasts VDO2 REP_NEWDESCRIPTION to all its linked representations. A representation which receives this message updates its own records, and converts and forwards the change to its Task Windows by sending them REP2WIN_CHANGEREP. Predictably, windows which receive such a message update their state and repaint.

When a user wishes to edit the particular range of a VDO which is being shown by a representation, he/she CTRL-clicks on the representation window. The window must get a description of the VDO in order to put up a dialogue (which will enable the user to choose a part of the VDO to link the representation to), and here there is a slight inconvenience. The window does not know about the VDO, nor does the VDO know about the window. Therefore, all communication between them must be sent via the representation object. The user's Ctrl-click causes the window to send WIN2REP_GETVDOINFO to the representation. If the representation is not linked to VDO, it replies with REP2WIN_NOVDOLINK, and nothing further occurs. If the representation is linked to a VDO, then it forwards the request for information to the VDO by sending a LO2HI_GETVDOINFO message.

On receiving this message, the VDO sends a HI2LO_HEREVDOINFO message back to the representation object, which forwards it to the requesting window with a LO2WIN_HEREVDOINFO message. Note that the identity of the source window of the request is passed as part of the message and is not stored by the representation object; therefore, each message is a complete transaction that does not rely on any state of any of the objects involved. This means that there is no problem if several such operations interleave on the same objects.

Once the requesting window has the description of the VDO, it puts up a dialogue to enable the user to select a range. If the user cancels this dialogue, then the operations terminate. Otherwise (the user presses the "OK" button), the window sends WIN2LO_CHANGEREP to the representation object. Here again, there is a complication. If the representation updated its range from this message, it would not know the correct data for that range (only the VDO knows the correct data). Rather than make a partial update like this, the representation forwards the new range to the VDO by sending it REP2VDO_CHANGEREP. The VDO does not alter its state on receiving this message, instead it fills in the data values for the selected range and replies to the representation with VDO2REP_CHANGEREP. On receiving this message, the representation updates its state (both range selected and data values for that range), and informs its windows by sending them REP2WIN CHANGEREP. These windows, of course, update their data and repaint themselves. A user can alter data held by the VDO by altering the data displayed by a representation object linked to the VDO, e.g., by changing the heights of the bars in a bar chart.

Figure 8:
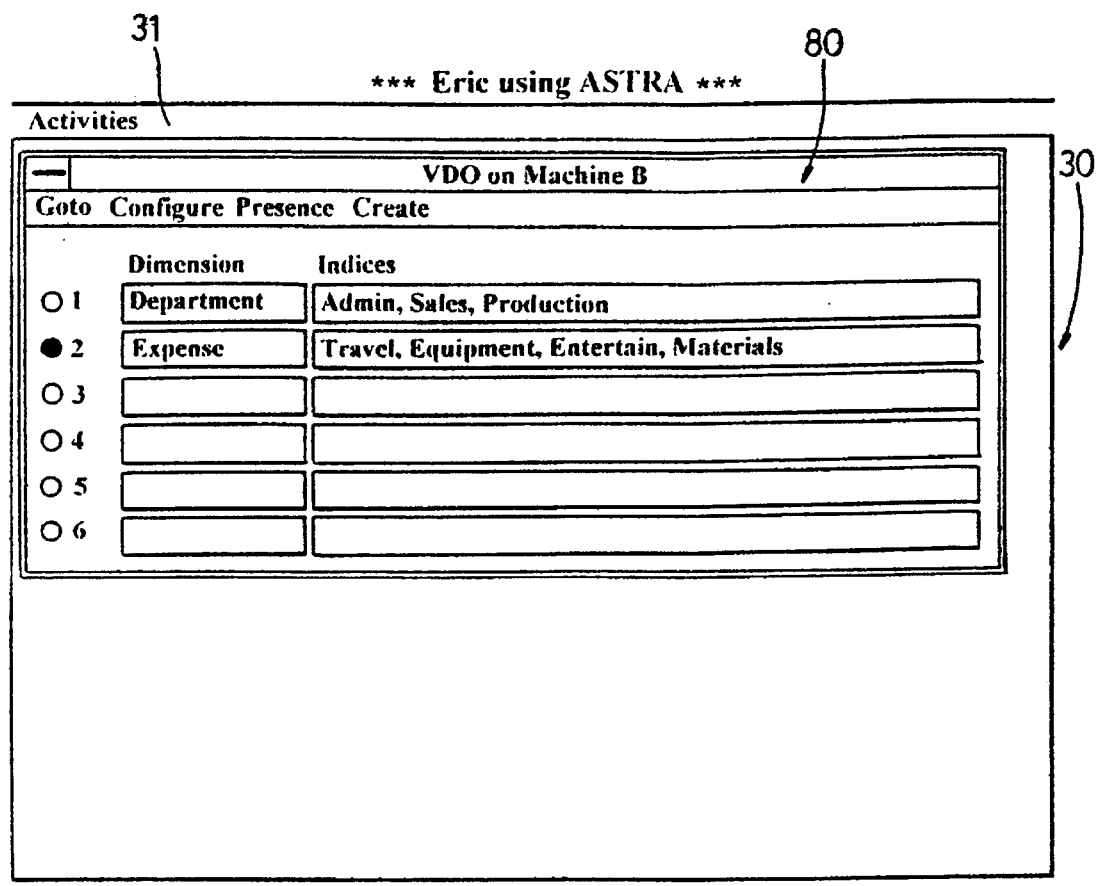
FIGS. 8–10 are screen representations in accordance with the techniques of the invention.
Figure 9:
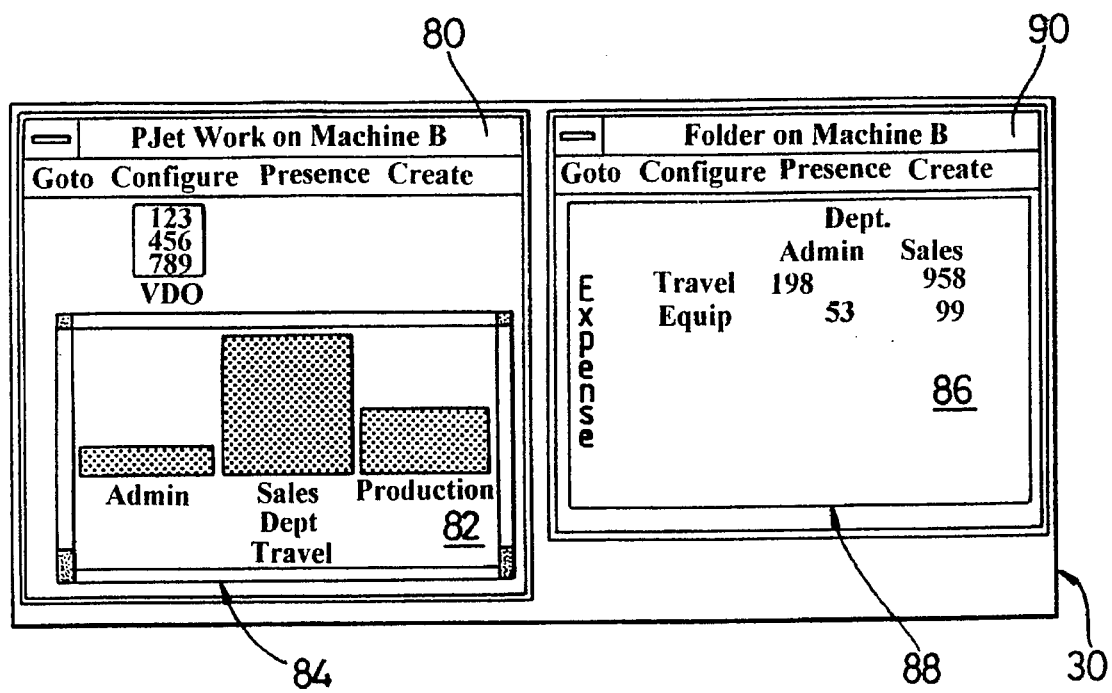
Figure 10:
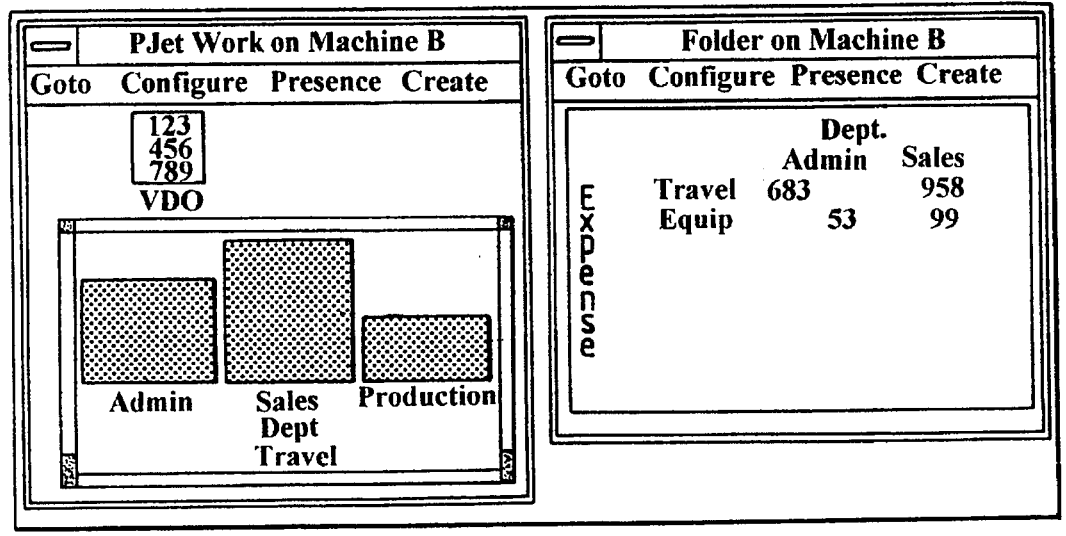

In FIG. 8, the user is viewing a VDO in a Task Window 80 which shows the dimensions and indices of the VDO but not the actual data. The System Window 30 is visible in the background. FIGS. 9 and 10 each show a Bar Chart secondary object 82 linked to the VDO being viewed in a Secondary Window 84 in the Task Window 80 and a Table secondary object 86 being viewed in a secondary Window 88 in another Task Window 90 which is also linked to the VDO. FIGS. 9 and 10 show how altering an entry in the Table (for Admin Department Travel) causes a corresponding change in the Bar Chart owing to a change in the data held by the VDO.

Whenever a user alters data displayed by a representation window, the NewValue operation occurs. First, the window checks to see whether it has sent an update to that data element which has not yet been acknowledged. If the last change has not been acknowledged yet, then the window does nothing until that acknowledgement arrives. Then, it compares the value returned by the acknowledgement message with the current value of the data, and if they are different it sends another change message. If no acknowledgements are outstanding, then the window will tell the representation to change the value of the data element by sending it a WIN2LO_NEWVALUE message. This message will have a unique tag which the window also stores: this allows the window to match future acknowledgement messages to those it is expecting.

A representation object which receives a WIN2LO_NEWVALUE message will either translate the index from its own indices into VDO indices and forward the change by sending REP2VDO_NEWVALUE (if it is linked to a VDO), or send LO2WIN_NEWVALUE to all its viewers (if it is not).

If a VDO receives REP2VDO_NEWVALUE, it will update its data and send VDO2REP_NEWVALUE to all its linked representations. Each representation which receives this message will check to see if the changed element is within the range which it has selected; if not, it will take no further action. Otherwise, it will check the tag on the update message. If the representation is waiting for an acknowledgement to a previous update for the data element and this message is not that acknowledgement, then the representation will take no further action (there is no point in changing a data element when another change to it is expected anyway). If the representation does decide to take action, it will update its own data and inform its windows by sending them LO2WIN_NEWVALUE. Each window which receives this message will also check the tag, as the representation does, and will either ignore the update or repaint the data element.

It is envisaged that the VDO may itself be linked to a further object, e.g., a database, from which it obtains data and indeed that there may be several levels of objects linked by updating links below a representation object displayed to a user.

The invention is not restricted to the details of the foregoing description made with reference to the accompanying drawings. For example, an MS DOS system is described operating under Microsoft Windows. Other operating systems, graphical user interfaces and networks may be employed. In one example, OS/2 is used with a Presentation Manager and a LAN. This package of software would replace, in FIG. 1, the integers 12, 14, 18 and 20.

The system described with reference to the accompanying drawings is a networked system of multi-tasking personal computers. The PC's themselves are not multi-user, but the networked system is. The invention is applicable also to a multi-user computer running, for example, under UNIX and having multiple terminals.

Although an exemplary embodiment of the invention has been described in detail above, those skilled in the art will readily appreciate that many additional modifications are possible in the exemplary embodiment without materially departing from the novel teachings and advantages of this invention. Accordingly, the modifications suggested above and any other modifications are intended to be included within the scope of this invention as defined in the following claims.

We claim:
1. A distributed object based computer system comprising:
   a plurality of data objects;
   a plurality of window objects for viewing said data objects;
   a plurality of representation objects linked to certain of said data objects, at least some of the data of said representation objects being taken from the data objects to which said representation objects are linked, and said representation objects, when activated, controlling the presentation of data of said certain data objects to said plurality of window objects;
   means for linking one of said certain data objects to at least one of said representation objects so that said at least one representation object receives details of changes made to data of said one certain data object to which said at least one representation object is linked;
   an object manager for activating data objects and representation objects by associating respective processes with said data objects and said representation objects; and
   means for linking a plurality of window objects to said at least one representation object so that a plurality of users can view said at least one representation object using said plurality of window objects.

2. A system according to claim 1, further comprising means for concurrently linking a plurality of representation objects to a data object for representing the data of said data object.

3. A system according to claim 1, further comprising means for concurrently linking a plurality of representation objects to different parts of a data object for representing different portions of data of said data object.

4. A system according to claim 1, further comprising means for providing a plurality of concurrent presentations of a representation object to a plurality of users.

5. A system according to claim 1, further comprising means for changing data of a data object by changing the data of a representation object linked to said data object.

\* \* \* \* \*